(12) United States Patent
Okubi et al.

(10) Patent No.: US 10,701,513 B2
(45) Date of Patent: Jun. 30, 2020

(54) RAISING PRIORITIES OF INFORMATION BASED ON SOCIAL MEDIA RELATIONSHIPS

(71) Applicant: TOYOTA JIDOSHA KABUSHIKI KAISHA, Toyota-shi (JP)

(72) Inventors: Ryota Okubi, Funabashi (JP); Keiko Suzuki, Suginami-ku (JP); Ryotarou Fujiwara, Suginami-ku (JP); Takeshi Fujiki, Shinagawa-ku (JP); Makoto Honda, Shinagawa-ku (JP); Chikage Kubo, Chofu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/656,643

(22) Filed: Oct. 18, 2019

(65) Prior Publication Data

US 2020/0162838 A1 May 21, 2020

(30) Foreign Application Priority Data

Nov. 15, 2018 (JP) ................................ 2018-214798

(51) Int. Cl.
*H04W 4/021* (2018.01)
*H04W 4/029* (2018.01)
*H04L 12/58* (2006.01)

(52) U.S. Cl.
CPC ........... *H04W 4/021* (2013.01); *H04W 4/029* (2018.02); *H04L 51/32* (2013.01)

(58) Field of Classification Search
CPC ........ H04W 4/021; H04W 4/029; H04L 51/32

USPC ............................................... 455/456.1–457
See application file for complete search history.

(56) References Cited

U.S. PATENT DOCUMENTS

| | | | | |
|---|---|---|---|---|
| 2011/0264648 | A1* | 10/2011 | Gulik | G06F 16/9535 707/722 |
| 2012/0185472 | A1* | 7/2012 | Ahmed | G06F 16/9535 707/728 |
| 2013/0036112 | A1* | 2/2013 | Poon | G06F 16/951 707/723 |
| 2014/0089323 | A1 | 3/2014 | Wu et al. | |
| 2018/0285946 | A1* | 10/2018 | Figueredo | G06Q 30/0282 |

FOREIGN PATENT DOCUMENTS

| | | |
|---|---|---|
| JP | 2007-206876 A | 8/2007 |
| JP | 2013-25517 A | 2/2013 |
| WO | WO 2018/037592 A1 | 3/2018 |

\* cited by examiner

*Primary Examiner* — Michael Y Mapa
(74) *Attorney, Agent, or Firm* — Oblon, McClelland, Maier & Neustadt, L.L.P.

(57) ABSTRACT

An information providing device includes a receiving unit configured to receive identification information of a first user and a character string from a terminal, an extracting unit configured to extract place information associated with the character string from action histories of a plurality of persons, a first identification unit configured to identify a second user that the first user follows by consulting information that represents a relationship between users on social media, an adjusting unit configured to, of the extracted place information, raise a priority of the place information contained in the action history of the second user as compared to the other place information; and a sending unit configured to send the extracted place information and the priority of the place information to the terminal.

6 Claims, 3 Drawing Sheets

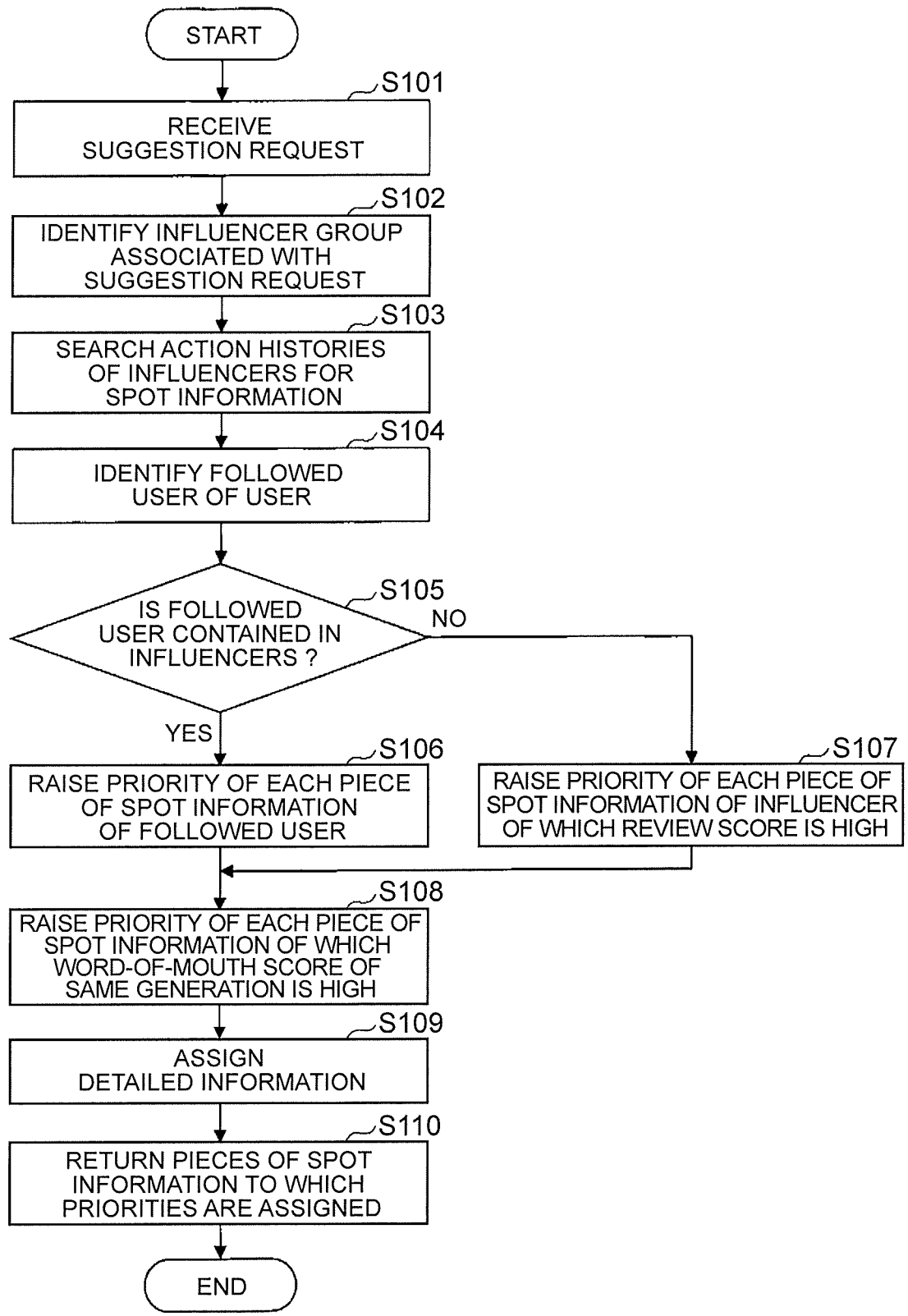

RAISING PRIORITIES OF INFORMATION BASED ON SOCIAL MEDIA RELATIONSHIPS

INCORPORATION BY REFERENCE

The disclosure of Japanese Patent Application No. 2018-214798 filed on Nov. 15, 2018 including the specification, drawings and abstract is incorporated herein by reference in its entirety.

BACKGROUND

1. Technical Field

The disclosure relates to an information providing device, an information providing method, and a program.

2. Description of Related Art

Hitherto, some vehicles are able to communicate with a server via a network, such as a mobile communication network, and provide users (drivers or others) with information about points of interest (POIs) or other information prestored in the server.

Provision of not only POT information but also information about places where a plurality of vehicles more than or equal to a predetermined number has parked for a predetermined period of time or longer and to which no POI information is assigned has been discussed (see, for example, Japanese Unexamined Patent Application Publication No. 2013-025517 (JP 2013-025517 A)).

SUMMARY

However, the existing technique does not consider preferences, or the like, of each recipient on information, so pieces of information that are provided to recipients in response to an information providing request under the same condition are uniform. Therefore, it is presumable that there is room for improvement in the probability that information that is sought by a recipient is provided to the recipient.

The disclosure is made in view of the above point, and it is an object of the disclosure to improve the probability that information that is sought by a recipient of the information is provided to the recipient.

An information providing device of an embodiment of the disclosure includes a receiving unit configured to receive identification information of a first user and a character string from a terminal, an extracting unit configured to extract place information associated with the character string from action histories of a plurality of persons, a first identification unit configured to identify a second user that the first user follows by consulting information that represents a relationship between users on social media, an adjusting unit configured to, of the extracted place information, raise a priority of the place information contained in the action history of the second user as compared to the other place information; and a sending unit configured to send the extracted place information and the priority of the place information to the terminal.

Thus, the priority of the place information found from the action history of the followed user of the first user is raised.

Therefore, the probability that information that is sought by a recipient of the information is provided to the recipient is improved.

The information providing device of another embodiment of the disclosure may further include a second identification unit configured to identify a third user who has a relatively strong influence in terms of the character string based on details of a post on social media, and the adjusting unit may be configured to raise the priority of the place information contained in the action history of the second user corresponding to the third user as compared to the other place information.

Thus, the priority of the place information that a person who has a relatively strong influence in terms of a keyword has dropped by is raised.

Therefore, the reliability of the priority of the place information is improved.

An information providing method of an embodiment of the disclosure, which a computer executes, includes a receiving step of receiving identification information of a first user and a character string from a terminal, an extracting step of extracting place information associated with the character string from action histories of a plurality of persons, a first identification step of identifying a second user that the first user follows by consulting information that represents a relationship between users on social media, an adjusting step of, of the extracted place information, raising a priority of the place information contained in the action history of the second user as compared to the other place information; and a sending step of sending the extracted place information and the priority of the place information to the terminal.

Thus, the priority of the place information found from the action history of the followed user of the first user is raised.

Therefore, the probability that information that is sought by a recipient of the information is provided to the recipient is improved.

A program of an embodiment of the disclosure causes a computer to execute a receiving step of receiving identification information of a first user and a character string from a terminal, an extracting step of extracting place information associated with the character string from action histories of a plurality of persons, a first identification step of identifying a second user that the first user follows by consulting information that represents a relationship between users on social media, an adjusting step of, of the extracted place information, raising a priority of the place information contained in the action history of the second user as compared to the other place information; and a sending step of sending the extracted place information and the priority of the place information to the terminal.

Thus, the priority of the place information found from the action history of the followed user of the first user is raised.

Therefore, the probability that information that is sought by a recipient of the information is provided to the recipient is improved.

The probability that information that is sought by a recipient of the information is provided to the recipient is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart for illustrating an example of a procedure that the server device executes.

DETAILED DESCRIPTION OF EMBODIMENTS

Figure 1:
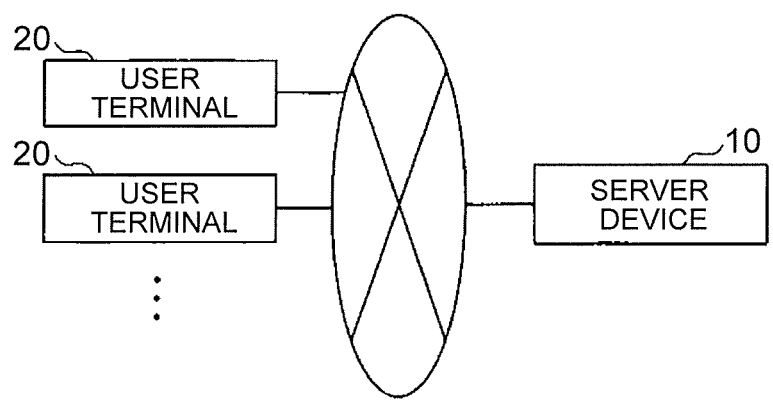
FIG. 1 is a diagram that shows an example of the configuration of an information providing system in an embodiment of the disclosure.

Hereinafter, an embodiment of the disclosure will be described with reference to the accompanying drawings. FIG. 1 is a diagram that shows an example of the configuration of an information providing system in the embodiment of the disclosure. In FIG. 1, the information providing system includes one or more user terminals 20 and the server device 10.

The user terminal 20 is an information processing terminal that a user of a service (hereinafter, simply referred to as user) that is provided by the server device 10 uses. For example, a mobile information processing terminal, such as a smartphone and a tablet terminal, may be used as the user terminal 20. Alternatively, an information processing terminal mounted on a vehicle, as in the case of an in-vehicle device, may be used as the user terminal 20. The user terminal 20 is able to communicate with the server device 10 via a predetermined communication network including a mobile communication network, the Internet, or other networks. The mobile communication network is a wireless communication network whose terminals are a large number of base stations.

The server device 10 is one or more computers that provide the user terminal(s) 20 with information that is sought by the user(s) (information suitable for the preferences of the user(s)).

Figure 2:
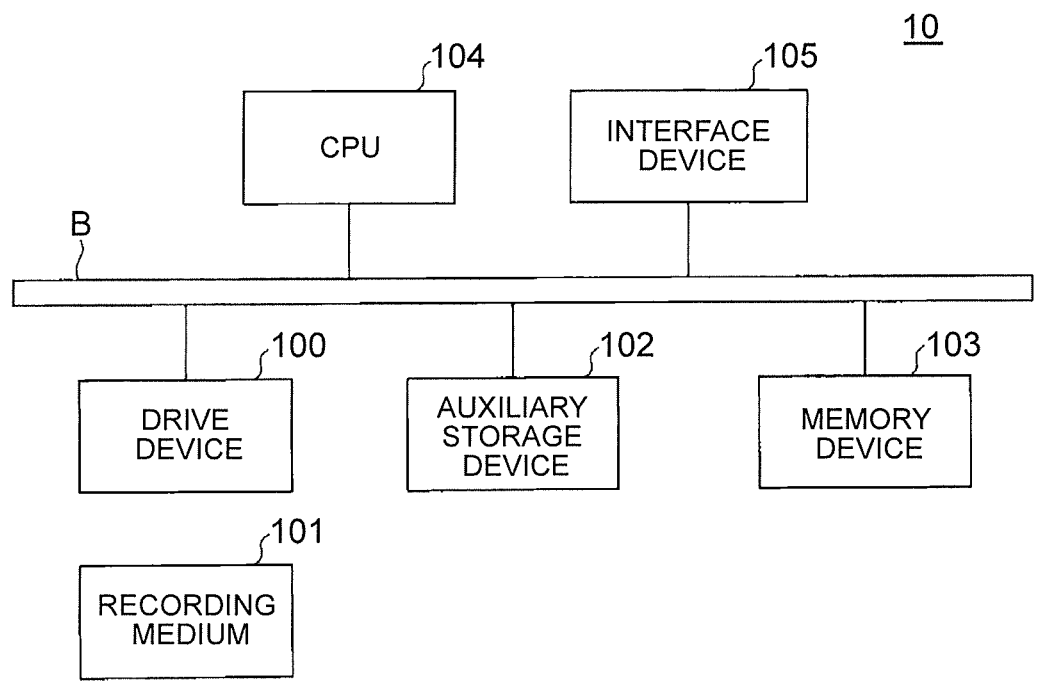
FIG. 2 is a diagram that shows an example of the hardware configuration of a server device in the embodiment of the disclosure.

FIG. 2 is a diagram that shows an example of the hardware configuration of the server device 10 in the embodiment of the disclosure. The server device 10 of FIG. 2 includes a drive device 100, an auxiliary storage device 102, a memory device 103, a CPU 104, an interface device 105, and other devices, connected to one another via a bus B.

A program that implements a process in the server device 10 is provided by a recording medium 101, such as a CD-ROM. When the recording medium 101 storing the program is set in the drive device 100, the program is installed from the recording medium 101 onto the auxiliary storage device 102 via the drive device 100. Installation of the program is not necessarily performed from the recording medium 101 and may be downloaded from another computer via a network. The auxiliary storage device 102 stores the installed program and stores necessary files, data, and other information.

Upon receiving an instruction to launch the program, the memory device 103 reads the program from the auxiliary storage device 102 and stores the program. The CPU 104 executes functions of the server device 10 in accordance with the program stored in the memory device 103. The interface device 105 is used as an interface for connecting to the network.

Figure 3:
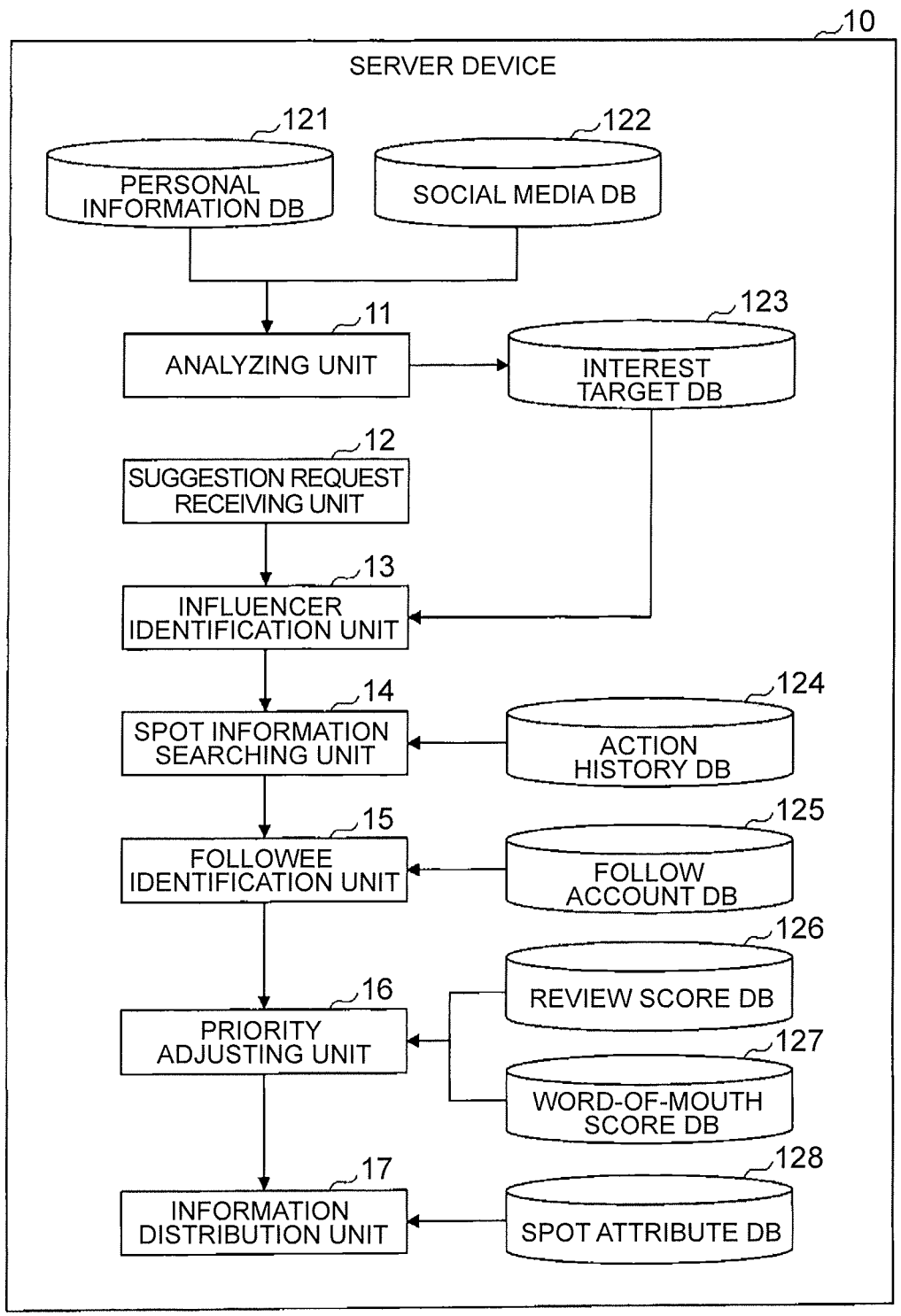
FIG. 3 is a diagram that shows an example of the functional configuration of the server device in the embodiment of the disclosure.

FIG. 3 is a diagram that shows an example of the functional configuration of the server device 10 in the embodiment of the disclosure. In FIG. 3, the server device 10 includes an analyzing unit 11, a suggestion request receiving unit 12, an influencer identification unit 13, a spot information searching unit 14, a followee identification unit 15, a priority adjusting unit 16, an information distribution unit 17, and other functions. These units are implemented by processes that one or more programs installed on the server device 10 cause the CPU 104 to run. The server device 10 uses databases (storage units) such as a personal information DB 121, a social media DB 122, an interest target DB 123, an action history DB 124, a follow account DB 125, a review score DB 126, a word-of-mouth score DB 127, and a spot attribute DB 128. These databases can be implemented by, for example, the auxiliary storage device 102, a storage device connectable to the server device 10 via the network, or other storage devices.

Personal information of users is stored in the personal information DB 121. Examples of the personal information include user ID, name, age, and sex. A user ID is the identification information of each user in the server device 10.

Posted details (contents, such as documents or images) on various social media (such as a social networking service (SNS), a blog, a personal diary, and a self-introduction) are stored in the social media DB 122 in association with the user ID of a writer. The social media DB 122 may be a collection of DBs for various social media. The server device 10 may provide services associated with various social media, or copies of contents of social media that are provided by persons different from an operator of the server device 10 may be stored in the social media DB 122.

The analyzing unit 11 analyzes a group of contents stored in the social media DB 122 by user ID and extracts frequent words in the group of contents for each user ID. A method of extracting frequent words just needs to be performed by using a known technique. The analyzing unit 11 stores the extracted result for each user ID in the interest target DB 123. That is, frequent words extracted from the group of contents posted by a user associated with a user ID and the frequency of each frequent word (for example, the number of occurrences) are stored for each user ID in the interest target DB 123. A process that is executed by the analyzing unit 11 is executed prior to processes that are executed by the other units.

The suggestion request receiving unit 12 receives a request to suggest spot information (hereinafter, simply referred to as suggestion request), which is sent from any one of the user terminals 20. Spot information means information (place information) about a place, such as a point, a facility, and a region (area). For example, point of interest (POI) information may be used as spot information. POI means, for example, a point, such as a shop and a facility, that is a target for guidance in a navigation system. A request to suggest spot information contains the user ID of a source user from which the request is sent (hereinafter, referred to as intended user). A keyword is a character string, such as a word, associated with a place, such as a facility and a region (area).

The influencer identification unit 13 identifies a person (hereinafter, referred to as influencer) that has a strong influence (that has a relatively strong influence) in terms of a keyword contained in a suggestion request received by the suggestion request receiving unit 12 by consulting the interest target DB 123 based on details of posts on social media. For example, the influencer identification unit 13 calculates the score of an influencer with reference to an indicator based on the number or frequency of frequent words that match with the keyword among frequent words stored in the interest target DB 123, and identifies users whose scores are top N as influencers in terms of the keyword. For example, a known method described in, for example, Japanese Unexamined Patent Application Publication No. 2007-206876 (JP 2007-206876 A), or the like, may be used to identify influencers based on the interest target DB 123.

The spot information searching unit 14 searches the action history DB 124 for a spot information group associated with a keyword (extracts the spot information group associated with the keyword from the action history DB 124). The action histories of a plurality of users are stored in the action history DB 12 in association with the user IDs of the users. An action history means, for example, information that pieces of spot information about places that each user has dropped by (for example, places where the user has stayed for a predetermined period of time or longer) are arranged in time sequence.

The followee identification unit 15 identifies a user(s) that the intended user follows on social media by consulting the follow account DB 125. Information that represents the relationship between users on social media is stored in the follow account DB 125. For example, the user IDs of other users that a user associated with a user ID follows may be stored for each user ID in the follow account DB 125.

The priority adjusting unit 16 adjusts the priority of each of pieces of spot information contained in spot information group found by the spot information searching unit 14 in consideration of users identified by the followee identification unit 15, information stored in the review score DB 126, the word-of-mouth score DB 127, and other databases, and other information.

Review scores of users by other users on social media are stored in the review score DB 126. A review score may be, for example, the number of views for posts on social media, the number of responses to posts, the number of affirmative responses to posts, or another indicator. Alternatively, a review score may be a value that is calculated by substituting a plurality of these indicators into a predetermined function.

Posted words of mouth associated with spot information are stored in the word-of-mouth score DB 127. The user ID of a user who posted a word of mouth is assigned to the word of mouth.

The information distribution unit 17 sends pieces of spot information found by the spot information searching unit 14 and the priorities of the pieces of spot information to the user terminal 20 of the intended user. At this time, the information distribution unit 17 acquires detailed information on spots associated with the pieces of spot information from the spot attribute DB 128 and incorporates the detailed information into the pieces of spot information. In other words, detailed information associated with a spot is stored for each spot (place) in the spot attribute DB 128.

Hereinafter, a procedure that the server device 10 executes will be described. FIG. 4 is a flowchart for illustrating an example of the procedure that the server device 10 executes.

In step S101, the suggestion request receiving unit 12 receives a suggestion request sent from any one of the user terminals 20. The suggestion request contains the user ID of an intended user and a keyword. The user terminal 20 may send a suggestion request to the server device 10 in response to an operation (manual input, voice input, or the like) made by the intended user or may send a suggestion request to the server device 10 at automated timing, such as at set time intervals. When a suggestion request is sent in response to an operation made by the intended user, the keyword that is incorporated in the suggestion request may be input by the intended user manually or by voice, or the user terminal 20 may automatically generate a keyword associated with a current position. When a suggestion request is sent at automated timing, the user terminal 20 just needs to automatically generate a keyword associated with a current position. Therefore, when a suggestion request is sent at automated timing, a keyword contained in a suggestion request changes with movement of the user terminal 20 (for example, movement of a vehicle on which the user terminal 20 is mounted or movement of the intended user who carries the user terminal 20).

Subsequently, the influencer identification unit 13 identifies each of the user IDs of the influencer group associated with the keyword contained in the suggestion request received by the suggestion request receiving unit 12 (hereinafter, referred to as target keyword) by consulting the interest target DB 123 (S102) The number of users of the influencer group may be one.

Subsequently, the spot information searching unit 14 searches the action histories of the influencers among the action histories of a plurality of users stored in the action history DB 124 for a spot information group associated with the target keyword (extracts a spot information group associated with the target keyword from among the action histories of the influencers among the action histories of a plurality of users stored in the action history DB 124) (S103). At this time, a search target may be limited to pieces of frequently appearing spot information for each influencer. In other words, pieces of spot information that each influencer has relatively frequently dropped by may be set for a search target. As an example, pieces of spot information of which the number of occurrences in action histories is greater than or equal to a threshold may be set for a search target. Spot information associated with a target keyword is, for example, spot information that contains the target keyword or spot information that contains a synonym of the target keyword.

Subsequently, the followee identification unit 15 identifies the user ID of a user that the intended user follows (hereinafter, referred to as followed user) by consulting the follow account DB 125 (S104). The number of followed users may be multiple.

Subsequently, the priority adjusting unit 16 determines whether the user ID of any one of the followed users is contained in the user ID group of the influencer group (S105). In other words, it is determined whether any one of the influencers is the followed user of the intended user.

When any one of the influencers is the followed user (Yes in S105), the priority adjusting unit 16, of the spot information group found in step S103 (hereinafter, referred to as target spot information group), relatively raises the priority of each piece of spot information found from the action history of the influencer (S106). For example, when it is assumed that the initial value of the priority of each piece of spot information contained in the target spot information group is zero, for example, five may be added to the priority of the corresponding spot information in step S106.

On the other hand, when none of the influences is the followed user (No in S105), the priority adjusting unit 16, of the target spot information group, relatively raises the priority of each piece of spot information found from the action histories of influencers whose review scores stored in the review score DB 126 are relatively high (S107). For example, a value proportional to a review score may be added to the priority of each piece of spot information contained in the target spot information group. However, a maximum value for addition may be less than a value that is added in step S106.

Subsequent to step S106 or step S107, the priority adjusting unit 16, of the target spot information group, relatively raises the priority of each piece of spot information of which the word-of-mouth score by users of the same generation as the intended user is relatively high (S108). For example, a value proportional to a word-of-mouth score may be added to the priority of each piece of spot information contained in the target spot information group. However, a maximum value for addition may be less than a value added in step S105 or step S106. A word-of-mouth score for each piece of spot information can be identified by consulting the word-of-mouth score DB 127. Users of the same generation as the intended user can be identified by comparing ages stored in the personal information DB 121 for the intended user and users of the words of mouth. For example, users of ages that are ±α relative to the age of the intended user may be identified as users of the same generation as the intended user. A word-of-mouth score may be the number of words of mouth, the total score of review scores contained in words of mouth, or the like.

Subsequently, the information distribution unit 17 acquires detailed information of each piece of spot information in the target spot information group from the spot attribute DB 128, and incorporates the acquired detailed information into the spot information (S109). Subsequently, the information distribution unit 17 sends (outputs), to the user terminal 20, the pieces of spot information to which the priorities are assigned (S110). At this time, the information distribution unit 17 may sort pieces of spot information in descending order of priority and send the arrangement of the sorted pieces of spot information to the user terminal 20. In this case, priority need not be assigned to each piece of spot information. This is because the order of pieces of spot information represents priorities. When the number of pieces of spot information contained in the target spot information group exceeds M, the information distribution unit 17 may set only part of pieces of spot information of which the priority is higher than or equal to the M-th place for a sending target.

The user terminal 20 that has received the target spot information group outputs (for example, shows) pieces of spot information based on the priorities. For example, on a map screen, a symbol according to a priority may be shown at a place corresponding to each piece of spot information. The intended user is able to check on spots suitable for the preferences of the intended user as to, for example, a current position, a destination, or the like, based on the spot information that is output from the user terminal 20.

How the influencer is treated and how the followed user is treated in the above description may be interchanged. Specifically, in step S103, the action history(s) of the followed user(s) may be searched for spot information. In this case, step S104 just needs to be executed before step S103. In this case, a spot information group found from the action history(s) of the followed user(s) is the target spot information group.

In this case, in step S105, it just needs to be determined whether there is an influencer among the followed user(s). In step S106, among the target spot information group, the priority of each piece of spot information found from the action history(s) of the followed user(s) that is/are an influencer(s) may be raised. In step S107, among the target spot information group, the priority of each piece of spot information found from the action history(s) of the followed user(s) of which the review score stored in the review score DB 126 is relatively high may be raised.

As described above, according to the present embodiment, the priority of each piece of spot information found from the action history(s) of the followed user(s) of the intended user is raised and then the spot information is sent to the user terminal 20. It is presumable that a followed user is a target of interest of the intended user and the preferences are highly likely to be similar to each other. Therefore, the probability that information that is sought by a recipient of the information (information useful for a recipient) is provided to the recipient is improved.

In the present embodiment, of a followed user(s), the priority of each piece of spot information found from action history(s) of an influencer(s) is raised. An influencer is a person who has a relatively strong influence in terms of a keyword. When the priority of spot information of a spot that such a person has dropped by is raised, the reliability of the priority of spot information is improved.

When there is no followed user among an influencer(s) or when there is no influencer among a followed user(s), the priority of each piece of spot information found from the action history(s) of an influencer(s) or followed user(s) who gain(s) a high review from other users is raised. With this configuration, the reliability of the priority is improved.

A priority reflects the word of mouth of a user of the same generation as the intended user. Users of the same generation are highly likely to have a common target of interest as compared to users of other generation. Therefore, with this configuration, the reliability of the priority is improved.

The example in which a suggestion target is spot information is described above. Alternatively, the present embodiment may be applied to advertising distribution, visiting destination suggestion, or news distribution.

When applied to advertising distribution, a product purchase history, advertisement viewing history, or the like, of an influencer or followed user may be used as an action history. With this configuration, an effective sales promotion is expected.

When applied to visiting destination suggestion, effective facilitation of movement is expected.

When applied to news distribution, a submission history (post history), or the like, of an influencer just needs to be used as an action history. With this configuration, the intended user is able to effectively collect information.

In the present embodiment, the server device 10 is an example of an information providing device. The suggestion request receiving unit 12 is an example of a receiving unit. The spot information searching unit 14 is an example of an extracting unit. The followee identification unit 15 is an example of a first identification unit. The priority adjusting unit 16 is an example of an adjusting unit. The influencer identification unit 13 is an example of a second identification unit. The information distribution unit 17 is an example of a sending unit. The intended user is an example of a first user. The followed user is an example of a second user. The influencer is an example of a third user. The spot information is an example of place information.

The embodiment of the disclosure is described in detail; however, the disclosure is not limited to the above-described specific embodiment. Various modifications or alterations are applicable within the scope of the purport of the disclosure described in the appended claims.

What is claimed is:

1. An information providing device comprising:
circuitry configured to:
receive identification information of a first user and a character string from a terminal;

extract place information associated with the character string from action histories of a plurality of persons;
identify a second user that the first user follows by consulting information that represents a relationship between users on social media;
identify one or more third users who have a relatively strong influence in terms of the character string based on details of a post on social media;
determine whether or not the second user is among the one or more third users;
of the extracted place information, raise a priority of the place information contained in the action history of the second user as compared to the other place information when the second user is among the one or more third users;
of the extracted place information, raise a priority of the place information contained in the action history of the one or more third users as compared to the other place information when the second user is not among the one or more third users; and
send the extracted place information and the priority of the place information to the terminal.

2. The information providing device according to claim 1, wherein the circuitry is configured to extract the place information from the action histories of the one or more third users.

3. The information providing device according to claim 1, wherein the circuitry is configured to extract the place information from the action history of the second user.

4. The information providing device according to claim 1, wherein the circuitry is configured to raise the priory of the place information based upon a word-of-mouth score by users of a same generation as the first user.

5. An information providing method that a computer executes, the information providing method comprising:
receiving identification information of a first user and a character string from a terminal;
extracting place information associated with the character string from action histories of a plurality of persons;
identifying a second user that the first user follows by consulting information that represents a relationship between users on social media;
identifying one or more third users who have a relatively strong influence in terms of the character string based on details of a post on social media;
determining whether or not the second user is among the one or more third users;
of the extracted place information, raising a priority of the place information contained in the action history of the second user as compared to the other place information when the second user is among the one or more third users;
of the extracted place information, raising a priority of the place information contained in the action history of the one or more third users as compared to the other place information when the second user is not among the one or more third users; and
sending the extracted place information and the priority of the place information to the terminal.

6. A non-transitory computer readable medium storing a program for causing a computer to execute:
receiving identification information of a first user and a character string from a terminal;
extracting place information associated with the character string from action histories of a plurality of persons;
identifying a second user that the first user follows by consulting information that represents a relationship between users on social media;
identifying one or more third users who have a relatively strong influence in terms of the character string based on details of a post on social media;
determining whether or not the second user is among the one or more third users;
of the extracted place information, raising a priority of the place information contained in the action history of the second user as compared to the other place information when the second user is among the one or more third users;
of the extracted place information, raising a priority of the place information contained in the action history of the one or more third users as compared to the other place information when the second user is not among the one or more third users; and
sending the extracted place information and the priority of the place information to the terminal.

* * * * *